United States Patent
Verdier

[15] 3,674,077
[45] July 4, 1972

[54] TIRE TREAD

[72] Inventor: Henri Verdier, Beauregard-L'Eveque, France

[73] Assignee: Compagnie General Des Etablissements Michelin raison sociale Michelin & Cie, Clermont-Ferrand, Puy-de-Dome, France

[22] Filed: July 20, 1970

[21] Appl. No.: 56,346

[30] Foreign Application Priority Data

July 21, 1969 France..................................6924850

[52] U.S. Cl..........................................................152/209
[51] Int. Cl.........................................................B60c 1/08
[58] Field of Search...................................................152/209

[56] References Cited

UNITED STATES PATENTS 1,946,209  2/1934  Hardeman et al. ....................152/209
3,196,920  7/1965  Fishman ................................152/209
D168,364  12/1952  Martin ...............................152/209 D Primary Examiner—James B. Marbert
Attorney—Brumbaugh, Graves, Donohue & Raymond

[57] ABSTRACT

The tread of a pneumatic tire is formed with symmetrical grooves, preferably S-shaped, extending from one edge of the tread to the other. The grooves are generally longitudinal in the central portion of the tread and generally transverse near the edges of the tread.

9 Claims, 2 Drawing Figures

TIRE TREAD

BACKGROUND OF THE INVENTION

This invention relates to pneumatic tires and more particularly to pneumatic tires formed with a novel and highly effective tread groove pattern.

The tread of a pneumatic tire is generally formed with grooves that define ribs or blocks of rubber in relief. These grooves play an important part in and exert a substantial influence on the adherence, wear and comfort qualities of the tire. It has generally been observed that the orientation of the grooves on the edges of the tread should preferably be different from the orientation of the grooves in the central portion of the tread; grooves of crosswise orientation on the edges of the tread and of longitudinal orientation in the central portion are generally preferable.

The combing of grooves of different orientations or different types (transverse grooves and circumferential grooves, straight-line grooves and sinusoidal or zigzag grooves) presents, however, the drawback of creating discontinuities in the tread, the edges being treated and behaving differently from the central portion.

SUMMARY OF THE INVENTION

An object of the present invention is to remedy the drawbacks of conventional tires noted above while retaining the advantages of the combination of grooves of different types, making the treatment and behavior of all portions of the tread uniform by employing a single type of groove.

The foregoing and other objects are attained in accordance with the invention by the provision of a pneumatic tire comprising in its tread grooves defining zones in relief of variable inclination. The grooves are characterized in that they extend from one edge of the tread to the other along an S-shaped path (or any symmetrical path) and form with the longitudinal direction of the tire an angle which decreases from each edge to the center of the tread.

In certain preferred embodiments:

a. The angle formed by the grooves with the longitudinal direction is equal to or nearly equal to 90° on the edges of the tread.

b. The angle formed by the grooves with the longitudinal direction assumes a minimum value of between 0° and 30° at the center of the tread.

c. The angle formed by the grooves with the longitudinal direction at any point of their path is such that the groove forms an angle close to 90° and in any event greater than 45° with the contour of the area of contact of the tire with the ground when said point passes over said contour.

The features described have the effect that the relief ribs forming the surface of the tread have lateral edges which are practically perpendicular to the contour of the area of contact when they enter into or emerge from the area of contact. This reduces the mobility and therefore improves the adherence of the ribs to the ground.

In other preferred embodiments:

a. The length of an S-shaped groove measured along the central circle has a value close to the longitudinal length of the contact area, that is to say, is between one-half and double the longitudinal length of the contact area.

b. If L is the width of a groove measured in a direction perpendicular to its path at a point thereof and $\alpha$ the angle formed by the groove at said point with the longitudinal direction, then the quantity $L/\sin\alpha$ is either constant or increases as the point moves from the center of the tread (i.e., from the center of the groove towards one or the other edge of the tread, or towards one or the other end of the groove.

c. The depth of the S-shaped groove is constant or substantially constant.

d. The cross-section Q of the S-shaped groove at a point where the groove has an inclination $\alpha$ with respect to the longitudinal direction is such that $Q/\sin\alpha$ is constant or increases from the center towards the edges.

These features, as well as the continuity of the S-shaped grooves from one edge of the tread to the other, facilitate the ejection of water and the drying of the contact area in case of movement over a wet road.

The S-shaped groove of the invention can be formed by a succession of portions each having a constant inclination with respect to the longitudinal direction, for instance a total of five to nine portions from one end to the other. It may also have an entirely (or partly) curved path with continuous (or partly continuous) variation of the inclination with respect to the longitudinal direction.

The successive S-shaped grooves constituting the design of the tread may be separate from each other, that is to say, not connected to each other, and may constitute the total of the recessed portions of the tread.

It is also in accordance with the invention to connect the S-shaped grooves together, for instance by short connecting grooves, localized in the central portion of the tread and arranged perpendicular to two successive S-shaped grooves and/or also by circumferential connecting grooves which connect the ends of all the S-shaped grooves.

BRIEF DESCRIPTION OF THE DRAWING

An understanding of additional aspects of the invention may be gained by a consideration of the following detailed description of a preferred embodiment thereof, in conjunction with the appended figures of the drawing, wherein.

DESCRIPTION OF THE PREFERRED EMBODIMENT

Figure 1:
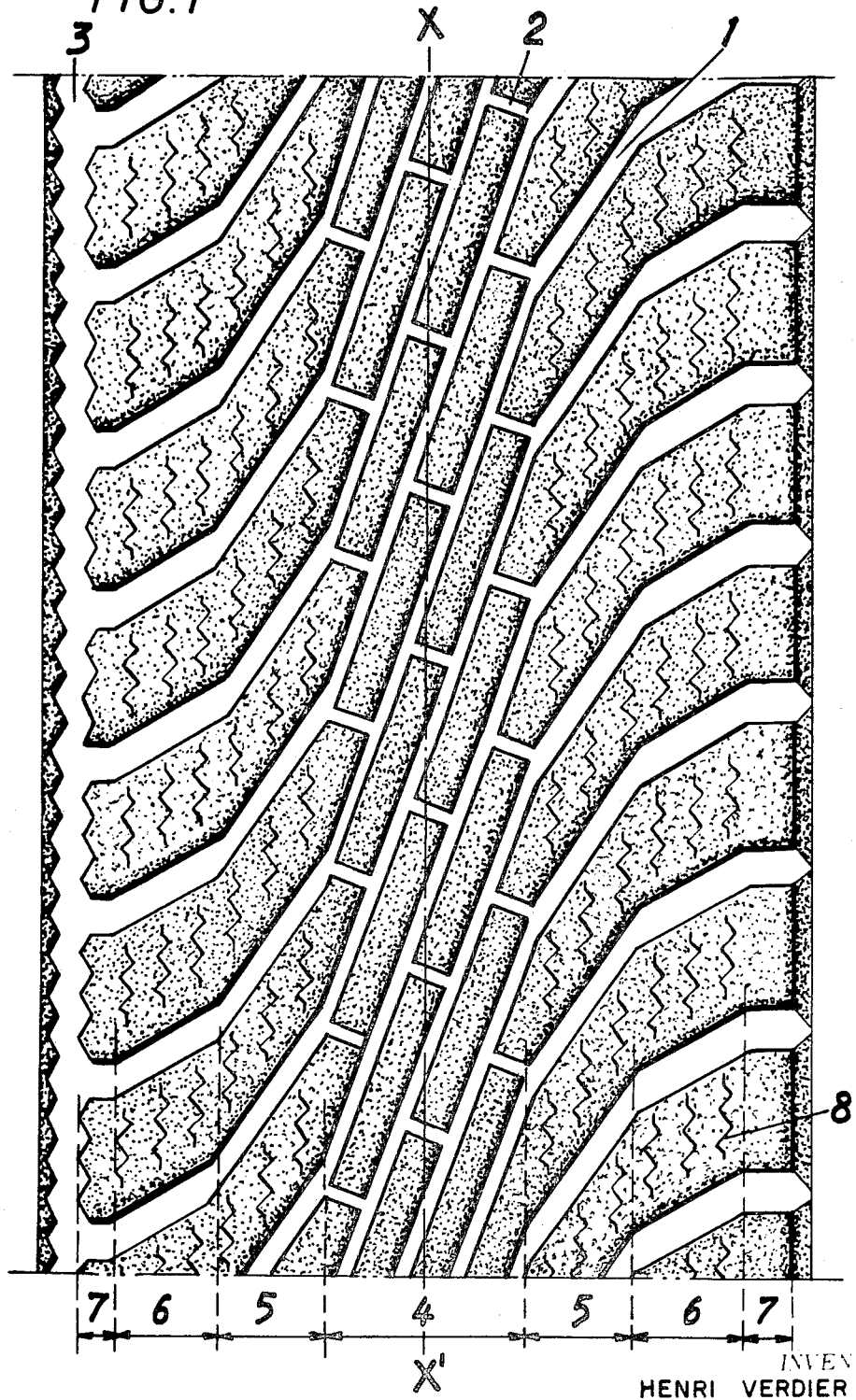
FIG. 1 is a developed plan view of a segment of a tread of a tire in accordance with the invention.

FIG. 1 shows a plurality of grooves 1 of S-shape. These grooves are connected by small grooves 2 in the central portion of the tread, as well as by a circumferential groove 3 provided along the lefthand edge of the tread. The latter connects the ends of the grooves 1. The groove 3 can be provided also along the righthand edge of the tread in addition to or instead of being employed at the lefthand edge.

The S-shaped grooves extend over a central portion 4 of the tread and, in this portion, are inclined by about 20° with respect to the longitudinal direction of the tire. The central portion 4 is surrounded by two portions 5 in which the S-shaped grooves are inclined by an angle of about 35° with respect to the longitudinal direction of the tire. On the outside of either portion 5 is a portion 6 in which the S-shaped grooves are inclined by an angle of about 60° with respect to the longitudinal direction of the tire. At each edge of the tread is a portion 7 in which the S-shaped grooves are inclined at 90° with respect to the longitudinal direction of the tire. In the portions 5 and 6 of the tread thin cuts 8 are provided between two successive S-shaped grooves 1.

The cross-section of the S-shaped grooves 1 (i.e., the section perpendicular to their path) has an area that increases from the center to the edge of the tread, that is to say, increases in succession in the portions 4, 5, 6 and 7, the depth being substantially constant. On the other hand, sections parallel to the central plane X—X' have substantially the same area regardless of where the section is taken.

Figure 2:
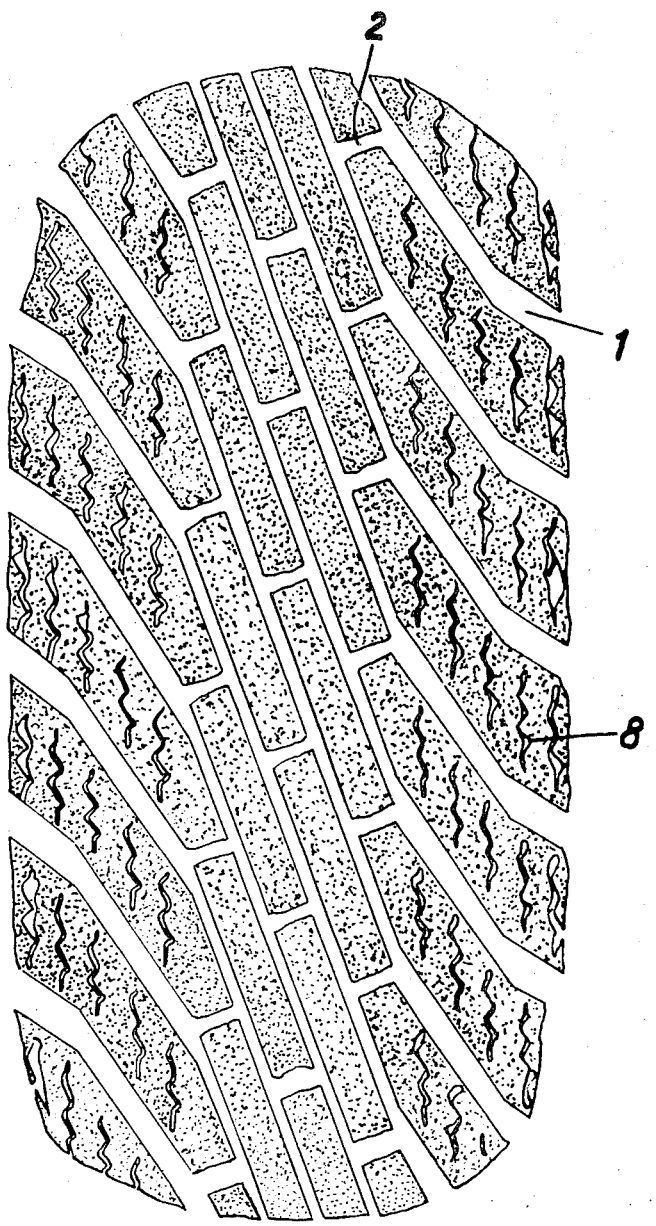
FIG. 2 shows the imprint on the ground of the tread of FIG. 1.

FIG. 2 showing an imprint made on flat ground by a pneumatic tire tread of which a segment is shown in FIG. 1, reveals that an S-shaped groove extends, from one of its ends to the other, substantially over the same longitudinal length as the area of contact. The area of contact for the normal load carried does not extend beyond the zones 6 of the S-shaped grooves.

Thus there is provided in accordance with the invention a novel and highly effective tire tread having the advantage of longitudinal grooves in the central portion and transverse grooves in the lateral portions without the disadvantage of discontinuities between the central and lateral portions.

Many modifications of the representative embodiment of the invention described above will readily occur to those skilled in the art upon reading the present specification. For example, it is within the scope of the invention to make the tread design asymmetrical, for instance by imparting different paths to the portions of the S-shaped grooves located on opposite sides of the central plane, or by modifying the pattern shown, for instance by providing a nonuniform spacing of the S-shaped grooves, or by imparting several different paths to the S-shaped grooves, following each other in accordance with any desired law, or else by superimposing on the type of tread pattern in accordance with the invention another type of tread pattern, such as a pattern made of circumferential or zigzag grooves and/or transverse grooves.

Accordingly, the invention is to be construed as including all of the embodiments thereof that fall within the scope of the appended claims.

I claim

1. A pneumatic tire comprising a tread formed with a set of grooves extending from one edge of the tread to the other and being repeated all around the tread in accordance with a single pattern, said grooves defining zones in relief bounded by adjacent grooves and also repeated all around the tread in accordance with a single pattern, said grooves and said zones in relief undergoing a gradual change in direction from one edge of the tread to the other without discontinuity when crossing the center line of the tread and forming with the longitudinal direction of the tire an angle that increases with increasing distance from the center line of the tread towards each edge of the tread.

2. A pneumatic tire according to claim 1 wherein said grooves are S-shaped.

3. A pneumatic tire according to claim 1 wherein said grooves form an angle with the longitudinal direction of the tire of substantially 90° at the edges of the tread and less than 30° at the center of the tread.

4. A pneumatic tire according to claim 1 wherein the length of one of said grooves is within the range of one-half to twice the longitudinal length of the tire imprint on flat ground under normal load.

5. A pneumatic tire according to claim 1 wherein $Q/\sin \alpha$ is a constant or increases from the center of the tread towards each edge, where Q is the cross-sectional area of one of said grooves and $\alpha$ is the inclination of the groove with respect to the longitudinal direction of the tread.

6. A pneumatic tire according to claim 1 wherein $L/\sin \alpha$ is a constant or increases from the center of the tread towards each edge, where L is the width of one of said grooves and $\alpha$ is the inclination of the groove with respect to the longitudinal direction of the tread.

7. A pneumatic tire according to claim 1 wherein each groove is formed of from five to nine segments, each segment being straight.

8. A pneumatic tire according to claim 1 further comprising short grooves in the central portion of the tread connecting the grooves of said set.

9. A pneumatic tire according to claim 1 comprising a circumferential groove at at least one edge of the tread, the grooves of said set opening into the circumferential groove.

* * * * *